US006342159B1

(12) United States Patent
Caplan et al.

(10) Patent No.: US 6,342,159 B1
(45) Date of Patent: *Jan. 29, 2002

(54) SHIPBOARD BIOMECHANICAL OIL WATER SEPARATOR

(75) Inventors: Jason A. Caplan; Donald W. Kelemen, both of Raleigh, NC (US)

(73) Assignee: Ensolve Biosystems, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/559,927

(22) Filed: Apr. 27, 2000

Related U.S. Application Data

(60) Continuation-in-part of application No. 09/149,702, filed on Sep. 8, 1998, now abandoned, which is a division of application No. 08/791,788, filed on Jan. 29, 1997, now Pat. No. 5,807,485.

(51) Int. Cl.$^7$ .............................. C02F 3/06; C02F 1/40; B01D 17/02
(52) U.S. Cl. ................ 210/610; 210/614; 210/615; 210/620; 210/150; 210/195.1; 210/201; 210/221.1; 210/242.1; 435/262.5
(58) Field of Search ................ 210/610, 611, 210/614–617, 620, 150, 195.1, 198.1, 201, 209, 220, 221.1, 242.1; 435/262, 262.5, 281

(56) References Cited

U.S. PATENT DOCUMENTS

| | | |
|---|---|---|
| 3,269,542 A | 8/1966 | Renzi et al. |
| 3,468,795 A | 9/1969 | Bye-Jorgensen et al. |
| 3,616,204 A | 10/1971 | Linn |
| 3,772,193 A | 11/1973 | Nelli et al. |
| 3,846,290 A | 11/1974 | Raymond |
| 3,913,513 A * | 10/1975 | Pedone |
| 3,937,662 A * | 2/1976 | Bartik |
| 3,938,692 A | 2/1976 | Crute |
| 3,941,692 A | 3/1976 | Gutnick et al. |
| 4,021,338 A | 5/1977 | Harkin |
| 4,072,614 A | 2/1978 | Harris |
| 4,137,171 A | 1/1979 | Yokata |
| 4,282,328 A | 8/1981 | Fukuda et al. |
| 4,311,593 A * | 1/1982 | Benjes et al. |
| 4,385,121 A | 5/1983 | Knowlton |
| 4,401,569 A | 8/1983 | Jhaveri et al. |

(List continued on next page.)

OTHER PUBLICATIONS

PCT/US01/40606 International Search Report Date Mailed 08/14/2001.

*Primary Examiner*—David A. Simmons
*Assistant Examiner*—Fred Prince
(74) *Attorney, Agent, or Firm*—Kilpatrick Stockton LLP

(57) ABSTRACT

Disclosed is a biomechanical apparatus and method for the continuous phase-separation and biological treatment of ship bilgewater contaminated with petroleum and biodegradable materials. The apparatus includes a pumping system attached directly to the bilge or waste oil holding tank for removing the biodegradable material(s) contained in the bilge waste aqueous and non-aqueous phases, which is integrated with a system for microbiologically treating the contaminated bilgewater. The system for microbiologically treating the contaminated bilgewater preferably includes petroleum- and hazardous material-degrading microorganisms. In operation, the three stage apparatus combines functions to physically separate petroleum hydrocarbons from the water phase, process and microbiologically destroy the petroleum hydrocarbons in the water and monitor and direct the discharge of the processed water overboard or recirculation back into the bilge compartment. The separated free-product is removed from the first stage, to a holding tank for off-site disposal, recycling or on-board incineration.

25 Claims, 6 Drawing Sheets

U.S. PATENT DOCUMENTS

| | | | |
|---|---|---|---|
| 4,426,293 A | 1/1984 | Mason et al. |
| 4,493,895 A | 1/1985 | Colaruotolo et al. |
| 4,511,657 A | 4/1985 | Colaruotolo et al. |
| 4,530,131 A | 7/1985 | Zell et al. |
| 4,545,909 A | 10/1985 | Atkinson et al. |
| 4,620,929 A | 11/1986 | Hofmann |
| 4,678,582 A | 7/1987 | Lavigne |
| 4,680,111 A | 7/1987 | Ueda |
| 4,683,064 A | 7/1987 | Hallberg et al. |
| 4,765,902 A | 8/1988 | Ely et al. |
| 4,803,166 A | 2/1989 | Kulpa et al. |
| 4,810,385 A | * 3/1989 | Hater et al. |
| 4,925,552 A | 5/1990 | Bateson et al. |
| 4,952,314 A | 8/1990 | Henricson et al. |
| 4,992,174 A | * 2/1991 | Caplan et al. |
| 5,080,782 A | 1/1992 | Caplan et al. |
| 5,173,092 A | 12/1992 | Rudder |
| 5,248,253 A | 9/1993 | Philipossian et al. |
| 5,254,253 A | * 10/1993 | Behmann |
| 5,277,794 A | 1/1994 | Delaney et al. |
| 5,340,376 A | * 8/1994 | Cunningham |
| 5,384,102 A | 1/1995 | Ferguson et al. |
| 5,388,542 A | 2/1995 | Fischer et al. |
| 5,549,828 A | * 8/1996 | Ehrlich |
| 5,567,324 A | 10/1996 | Rothmel et al. |
| 5,609,760 A | 3/1997 | Leach |
| 5,807,485 A | * 9/1998 | Caplan et al. |
| 5,965,015 A | 10/1999 | Ronan et al. |

\* cited by examiner

SHIPBOARD BIOMECHANICAL OIL WATER SEPARATOR

RELATED APPLICATION INFORMATION

The present application is a continuation-in-part of application Ser. No. 09/149,702, filed Sep. 8, 1998, abandoned, which is a division of application Ser. No. 08/791,788, filed Jan. 29, 1997 (now U.S. Pat. No. 5,807,485, issued Sep. 15, 1998).

FIELD OF THE INVENTION

The present invention relates to a method and biomechanical apparatus for treating ship bilge wastes contaminated with petroleum or biodegradable materials. More particularly, the invention relates to a method and apparatus for the physical separation of petroleum hydrocarbons from bilgewater and the subsequent microbiological remediation of the petroleum and biodegradable materials in the ship bilgewater.

BACKGROUND

The shipping industry and military generate millions of gallons per year of bilgewater contaminated with petroleum hydrocarbon and/or hazardous pollutants. The direct discharge of this contaminated bilgewater from commercial and non-commercial shipping vessels into the world's oceans and lakes is a universal environmental problem. Currently, the majority of such bilge wastes is processed through on-board oil/water phase separators. The separated oil is either stored in containers or pumped back to the bilge. The separated water is either sent overboard or back in the bilge area. However, the water that is processed by such separators often exceeds international and domestic regulatory standards for legal discharge. Local and international laws impose severe fines and/or imprisonment if ships discharge bilge waste while in harbor areas. Ship owners must dispose of the contaminated bilgewater by costly and inconvenient methods such as pump, haul, and incineration.

On shore, the storage and transportation of such bilge wastes requires countless tanks and pipelines. Substances typically processed and stored at these facilities include petroleum distillates, industrial solvents, and oily bilge wastes. Due to the dangers presented by storing and transporting concentrated solutions of these materials, engineers and government agencies conduct extensive research and development to insure the tanks and pipelines used will effectively and safely contain these materials. Weathering and unforeseen engineering limitations, however, often cause the facilities to fail, resulting in the release of chemicals into the environment from on-shore storage facilities.

The release of concentrated bilge wastes typically cause extensive damage to the local ecosystem by contaminating or killing indigenous plant and animal life. More remote ecosystems may be affected if the contamination migrates away from the site of ship discharge.

U.S. Pat. Nos. 4,072,614, 4,426,293, 5,277,794, 5,609,760, and 5,965,015 disclose methods to process oily water whereby oil is physically separated and removed prior to the discharge of the water phase from the separator system. Commercially available separators typically consist of a tank containing oleophobic filters, coalescing resin beads or hollow fiber membranes. These agents, combined with gravitational forces, separate oil from water. The various filters and beads components can be used individually or in combination to separate petroleum products from the bilgewater thereby insuring the overboard discharge of oil-free water into surrounding waters.

A major problem with these separator technologies is that concentrations of petroleum hydrocarbon contaminants remaining in the water phase often exceed the regulatory-allowed limits for discharge into open waters. The reasons for poor separator performance vary but include the typical presence of engine-cleaning detergents and other substances that emulsify oil into water, thereby allowing a higher percentage of oil to become associated with the aqueous phase. Ship agitation and inefficient phase separators allow significant amounts of petroleum to enter the aqueous phase as well. Also, under circumstances where filter technologies have been employed, these filters typically contain a significant volume of oil; consequently they are not typically capable of providing lengthy unattended service such that oil leakage from the filters can become a significant problem resulting in the overall poor performance of the oil water separator. In general, the operation and maintenance costs associated with oil water separators that utilize filter or coalescing bead technologies can be significant over the life of the unit. The net effect of these events is that relatively high amounts of petroleum can be, and are, discharged directly into the surrounding waters, thereby posing significant environmental risks as cited earlier.

U.S. Pat. Nos. 3,846,290, 4,385,121, 4,765,902, 4,992,174, and 5,080,782 disclose methods for reducing the amount of petroleum hydrocarbons in a solution. Although these methods achieve remediation in soil and groundwater environments, the methods are disadvantageous for cleanup of bilge wastes for a number of reasons. First, the equipment used is often large and cumbersome. This type of equipment would not be appropriate for ship environments because of space constraints often encountered in ships. A second reason pertains to the hydrocarbon-degrading microorganisms used to degrade the contaminants associated with bilgewater. Although indigenous microbial populations may be sufficient in terrestrial environments to biodegrade petroleum hydrocarbons that may have contaminated it, such microorganisms may not be present in the bilge environment. Because the oil/water mixture is periodically removed from the ship as a normal part of cleaning operations, any hydrocarbon-degrading microorganisms, which may be present, would also be removed in the process. Thirdly, terrestrial/groundwater bioreactor systems are not designed to treat oil contaminated with surfactants and cleansers often associated with bilge wastes. And fourthly, hydrocarbon-degrading microorganisms associated with terrestrial environments are typically not efficient degraders in surface water environments (i.e., saltwater).

U.S. Pat. No. 5,248,253 to Behmann describes the use of an onboard-activated sludge bioreactor combined with nutrients obtained from raw sewage ("black water" from toilets) and wastewater from showers, sinks, and kitchen facilities ("grey water") to biodegrade bilge oils. Although the method achieves some reductions of petroleum hydrocarbons, there are several drawbacks of this approach. First, the mixing of "black" and "grey" water to achieve optimal nutrient concentrations in the activated sludge bioreactor is not practical due to the inconsistent amount of nitrogen present in these materials. Second, appropriate concentrations of phosphate are not found in these "black" and "grey" waters to allow complete metabolism of petroleum hydrocarbons to occur. Third, activated sludge systems generate considerable sludge material (i.e., solids) which are cumbersome to deal with and expensive to dispose. Fourth, pathogenic microorganisms are often associated with "black" water wastes which present a risk to both humans and the environment when such water is discharged to open waters.

U.S. Pat. No. 3,938,692 whereby Gutnick et al. describes the application of microorganisms and nutrients to biodegrade residual oil in the emptied cargo compartments. This method involves the addition of microbes rather than the utilization of an on-site bioreactor. There are several limitations of this approach. First, the absence of a bioreactor limits the amount of dissolved oxygen required to complete metabolism of petroleum hydrocarbons. The method of the '692 patent is essentially an activated sludge batch reactor which is less efficient than continuous flow fixed-film bioreactors for the reasons cited earlier. In addition, the method does not allow control of the amount of hydrocarbon present in any given cargo compartment. High levels of petroleum hydrocarbons may be toxic or indigestible to microorganisms introduced into these compartments, whereas the current invention allows for the control of petroleum hydrocarbon concentrations being treated. Thirdly, there are no provisions for accurately maintaining the required nutrients within the cargo compartment in the method of the '692 patent.

U.S. Pat. No. 5,807,485 to Caplan and Kelemen addressed the need for a method and apparatus for the bioremediation of bilgewater contaminated with petroleum and hazardous substances. The described apparatus permits continual, efficient treatment of contaminated bilgewater by protecting the treating microbial inoculum from toxic overloading of the contamination, and generating an increased rate of remediation in the bilge waste environment. A potential disadvantage of this system is that it is primarily designed to remediate water previously processed by the shipboard oil-water separator. This reliance on a shipboard oil-water separator could therefore potentially limit the bioremediation apparatus continuous operation time because of the frequent and expected operational downtimes of typical shipboard oil-water separators.

SUMMARY OF THE INVENTION

The present invention meets the foregoing needs by providing an apparatus and method for the biological treatment of bilgewater contaminated with a biodegradable material, for example a petroleum product or a hazardous substance, i.e., a substance which may be classified as toxic, corrosive, irritants, flammable or combustible, or generating pressure in the course of decomposition. The basic approach is to treat the contaminated bilge waste using an interactive system comprising, in combination, a pumping system to transfer bilge waste directly from the shipboard bilge compartment or waste oil holding tank into the first compartment of the apparatus which separates the aqueous from non-aqueous (e.g., petroleum or hazardous substances) phases. The non-aqueous phase is transferred to a holding tank for eventual off-site disposal, recycling or on-board incineration. The aqueous phase is then pumped into a vessel, i.e., bioreactor, which removes dissolved constituents of the biodegradable material in the bilgewater. The bioreactor contains a culture of indigenous, genetically engineered, or enriched bacteria. When constructed and operated as disclosed herein the invention provides a fast and efficient means for the physical separation of highly concentrated oily bilge wastes (i.e., petroleum hydrocarbons) from emulsified oily bilgewater and remediating phase-separated contaminated bilgewater.

The apparatus generally includes a piping and pumping system, for the transfer of liquid bilge waste to a chamber or compartment of the apparatus whereby a system of hydrocarbon sensors, level switches, solenoid valve and piping facilitate the separation and transfer of non-aqueous phase material to a collection tank, a pumping and piping system for the transfer of the aqueous phase bilgewater, containing a dispersion of the biodegradable material into a second chamber, i.e., a bioreactor, for treating the transferred bilgewater, and a piping and pumping system for discharging the treated bilgewater either overboard or processed back into the bilge. Preferably, the treated bilgewater is discharged overboard if appropriate cleanup standards are achieved.

Gas and nutrient injection systems maintain the bioreactor, preferably containing viable cultures of microorganisms. The culture of microorganisms comprises microorganisms fixed to a support media in the vessel and microorganisms, arising from those attached to the support media, which slough off and disperse into the recirculating or discharged bilgewater. The microorganisms' method of attachment to the support media is not completely understood. However, experience and the scientific literature suggest that fixed-bed bioreactor systems are more tolerant to fluctuations in contaminant flow and concentrations than are activated sludge systems. Preferably, the microorganisms fixed to the support media regenerate so as to maintain a substantially constant microbial biomass within the vessel. In contrast to the methods disclosed in the patents discussed above, in the method of the present invention, nutrient concentrations and pH for optimal microbial growth and metabolism of petroleum hydrocarbons may be regulated.

After treatment, the bilgewater contains dissolved gases and nutrients, as well as those microorganisms sloughed off the support media. This treated water can then be discharged into open waters if regulatory standards are achieved or recirculated into the bilge, whereby the sloughed microorganisms act as a seed culture for stimulating in situ remediation of contaminated bilgewater. A secondary benefit of overboard discharging of the microbe-rich effluent from the bioreactor is the possible cleanup of petroleum slicks surrounding the ship.

The process of the present invention may be performed on any ship contaminated by biodegradable materials, including hazardous and non-hazardous substances degradable by microorganisms. Typical biodegradable materials, which may be biologically treated using the process of the invention, include alcohols, aromatics, carbohydrates, ketones, petroleum hydrocarbons, phenols, phthalates, chemical solvents, chlorinated compounds, detergents, and mixtures thereof.

The microbiological treatment means, operated as described herein, may be used to significantly reduce various concentrations of biodegradable materials dissolved in the bilgewater. Further, by integrating the bilge waste pumping system into the apparatus, the microbial culture is substantially protected from toxic overloading of the biodegradable materials. Accordingly, it is possible to continuously treat contaminated bilgewater without supplementing the treating culture to replace microorganisms lost due to the introduction of toxic concentrations of biodegradable materials.

BRIEF DESCRIPTION OF THE DRAWINGS

In the Figures, like reference characters indicate corresponding parts.

DETAILED DESCRIPTION OF THE INVENTION

Figure 1:
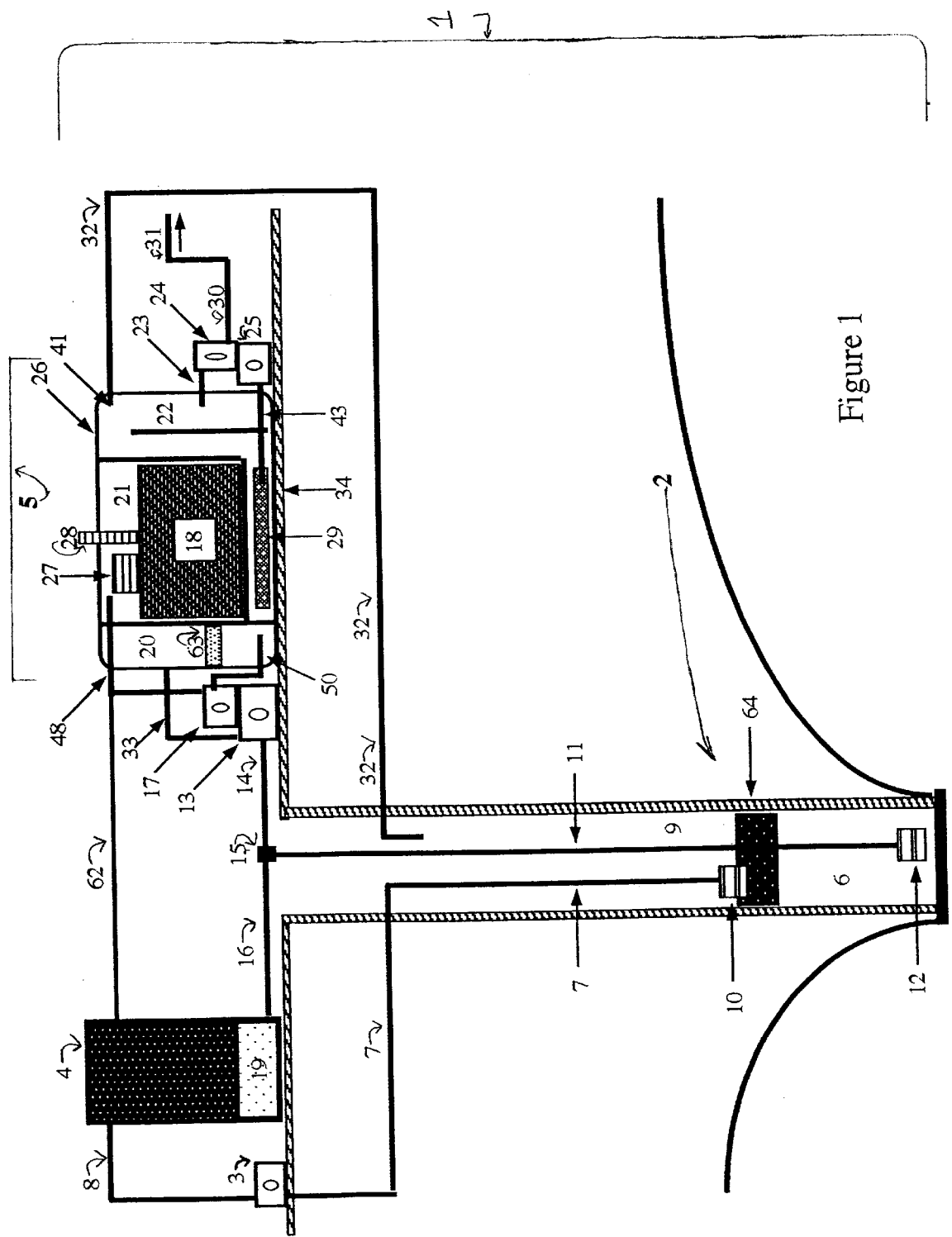
FIG. 1 is a schematic drawing of the biomechanical apparatus of the invention having a partial cut-away view of a biomechanical device useful in the invention.

The invention features an apparatus and method for the physical separation of petroleum hydrocarbons from bilgewater and the subsequent biological treatment of bilgewater contaminated with biodegradable materials.

In one aspect, the present invention provides a biomechanical apparatus for the microbiological remediation of a site contaminated with biodegradable materials comprising:

means for removing and processing a mixture of bilge wastes and water from waste oil holding tanks or similar shipboard waste oil holding facilities, means for removing liquid bilge wastes contaminated with biodegradable materials from both aqueous and non-aqueous phases, means for separating the non-aqueous phase of the contaminated bilge waste for independent disposal, a vessel for treating said removed aqueous phase bilgewater to cause the biodegradation of said biodegradable materials, means for discharging the treated bilgewater overboard, means for transferring non-aqueous phase liquid bilge wastes to a collection tank, means comprising a continuously regenerating culture of microorganisms disposed in said vessel, said culture comprising a film of microorganisms which are fixed to a support media in the vessel and microorganisms, arising from said film of fixed microorganisms, which slough off said support media and disperse into the contaminated bilgewater;

means for maintaining a flow of contaminated bilgewater over the culture of microorganisms;

means for introducing gases into said vessel to support the growth of the culture of microorganisms; and means for introducing nutrients into said vessel to support the growth of microorganisms.

In another aspect, the present invention provides an apparatus for the microbiological remediation of a site contaminated with a biodegradable material comprising:

means for separating phase separable hydrocarbons from water and biologically processing said water to remediate solubilized hydrocarbons, means for removing liquid bilge wastes contaminated with a biodegradable material from both aqueous and non-aqueous phases, means for transferring said non-aqueous phase liquid bilge wastes to a collection tank, means for delay-free monitoring of processed bilgewater prior to overboard discharge, means for recirculating the treated bilgewater and return of said treated bilgewater to the contaminated bilge site.

Preferably, the microorganisms fixed to the support media comprise a substantially constant microbial biomass. It is also preferred that the means for introducing gases into said vessel comprises a fine bubble diffuser.

In another aspect, the invention relates to an apparatus for the microbiological remediation of a site contaminated with a biodegradable material comprising:

means for removing liquid bilge wastes contaminated with biodegradable materials from both aqueous and non-aqueous phases comprising phase-separated hydrocarbon material;

a vessel for treating the liquid bilge wastes to cause the biodegradation of said biodegradable materials;

means for separating phase-separated hydrocarbon material from aqueous phase material in bilge compartment;

means for collecting the phase-separated hydrocarbon material;

means for minimizing emulsification of hydrocarbons in water;

means for optimizing separation of hydrocarbons from water, the means comprising a coalescing filter;

a microbiological chamber comprising hydrocarbon-degrading microorganisms;

means comprising a continuously regenerating culture of microorganisms disposed in the microbiological chamber, the culture comprising a film of microorganisms which are fixed to a support media in the microbiological chamber and microorganisms, arising from the film of fixed microorganisms, which slough off the support media and disperse into the aqueous phase material;

means for transferring the aqueous phase material to the microbiological chamber;

means for ensuring that phase-separated hydrocarbons do not get transferred to the microbiological chamber;

means for maintaining a flow of aqueous phase material over the culture of microorganisms;

means for introducing gases into the vessel to support the growth of the culture of microorganisms;

means for introducing nutrients into the vessel to support the growth of microorganisms; and means for discharging the treated aqueous phase material overboard. More preferably, the microorganisms fixed to the support media comprise a substantially constant microbial biomass. Also more preferably, the means for introducing gases into the vessel comprises a fine bubble diffuser.

In a preferred embodiment, the apparatus further comprises a means for removing bilgewater contaminated with biodegradable material from above, below, and within an aqueous phase/non-aqueous phase interface.

In another preferred embodiment, the apparatus further comprises means for recirculating treated aqueous phase material and returning the treated aqueous phase material to the contaminated bilge site; and means for delivering bilgewater containing nutrients, dissolved gases and microorganisms which slough off the support media to the means for recirculating and returning the aqueous phase material into the contaminated bilgewater within the contaminated bilge area;

whereby said culture of microorganisms provides both biodegradation of biodegradable material in said treated aqueous phase material and a substantially continuous feed of seed culture for in situ remediation of the bilge area which biodegrades biodegradable materials dissolved in the bilgewater located at said contaminated bilge area.

In another aspect the invention relates to an apparatus for the microbiological remediation of a site contaminated with a biodegradable material comprising:

a pump and piping system for removing liquid bilge wastes contaminated with biodegradable materials from both aqueous and non-aqueous phases comprising phase-separated hydrocarbon material;

a vessel for treating the liquid bilge wastes to cause the biodegradation of the biodegradable materials;

a pumping and piping system having intake inlets disposed such that phase-separated hydrocarbon material and aqueous phase material may be separately removed from a bilge compartment;

a vessel for collecting the phase-separated hydrocarbon material;

a microbiological chamber comprising a culture of hydrocarbon-degrading microorganisms;

a pumping and piping system for transferring the aqueous phase material to the microbiological chamber;

a pumping and piping system for maintaining a flow of aqueous phase material over the culture of microorganisms;

a pumping and piping system for discharging the treated aqueous phase material overboard. More preferably, the pumping and piping system for transferring the aqueous phase material to the microbiological chamber is adapted to minimize emulsification of hydrocarbons in water. Most preferably, the pumping and piping system comprises a non-emulsifying pump, e.g. a peristaltic pump or positive displacement pump.

In a preferred embodiment, the vessel for treating the liquid bilge wastes to cause the biodegradation of the biodegradable materials further comprises a subcompartment for optimizing separation of hydrocarbons from water. Most preferably, the subcompartment is in communication with a pumping and piping system having intake inlet comprising a coalescing filter.

In another preferred embodiment, the microbiological chamber comprises a continuously regenerating culture of microorganisms, the culture comprising a film of microorganisms which are fixed to a support media in the microbiological chamber. Most preferably, the microorganisms arising from said film of fixed microorganisms slough off said support media and disperse into said aqueous phase material.

In another preferred embodiment, the microbiological chamber further comprises a pumping system for introducing gases into the microbiological chamber to support the growth of the culture of microorganisms. Most preferably, the pumping system comprises an outlet connected to a fine bubble diffuser.

In another preferred embodiment, the microbiological chamber further comprises an inlet for introducing nutrients to support the growth of microorganisms. More preferably, the inlet comprises a nutrient introduction chamber in communication the exterior of the apparatus and with the interior of the microbiological chamber, such that movement of liquid within the chamber causes release of the nutrients into the microbiological chamber from the nutrient introduction chamber.

In another preferred embodiment, the microbiological chamber further comprises an inlet comprising one or more nutrient introduction tubes or containers in communication with the exterior of the apparatus and with the interior of the microbiological chamber, such that movement of liquid within the chamber causes release of said nutrients into the microbiological chamber from the outlets of the one or more nutrient introduction tubes or containers.

As set forth above, biodegradable materials include, but are not limited to, hazardous and non-hazardous substances including: alcohols, aromatics, carbohydrates, ketones, petroleum hydrocarbons, phenols, phthalates, chemical solvents, chlorinated compounds, detergents and mixtures thereof. In particular, bioremediation utilizing the method of the present invention is effective for the treatment of a wide variety of biodegradable materials commonly used aboard ships and in the shipping industry. Biodegradable materials which may be bioremediated using the process of the invention includes; but are not limited to:

(a) alcohols, e.g., isopropanol, ethanol, t-butanol, ethylene glycols;

(b) aromatics, e.g., benzene, toluene, ethylbenzene, xylenes;

(c) carbohydrates, e.g., glucose, fructose;

(d) ketones, e.g., methylethylketone;

(e) petroleum hydrocarbons, e.g., gasoline, diesel, bilge oil, fuel oils, motor oils, bunker oil;

(f) hydraulic fluids, e.g., brake fluid, transmission fluid, power steering fluid;

(g) phenols, e.g., chlorophenol;

(h) phthalates, e.g., o-phthalate;

(i) solvents, e.g., methylene chloride, acetone, Stoddard solvent, tetrahydrofuran;

(j) chlorinated compounds, e.g., monochlorobenzene, 1,2-dichloroethane;

(k) detergents;

(l) synthetic oils and lubricants; and (m) mixtures thereof.

It should be recognized, however, that virtually any material, which may be biodegraded, might be treated using the apparatus and/or method of the present invention.

The invention includes a bilge waste pumping system, phase separation and a microbiological treatment means which interact to protect the bioremediating culture from toxic overloading of the biodegradable material during operation, thus ensuring continuous and efficient remediation. The interaction of these subunits also produces an increased rate of remediation in the bilge waste environment when compared with other biological, chemical, and physical remediation techniques.

An embodiment of an apparatus of the present invention is depicted in FIG. 1. Referring to FIG. 1 there is shown a biomechanical remediation apparatus 1 located at a ship bilge site 2. The biomechanical remediation apparatus 1 includes a bilge waste pumping system 3, for removing biodegradable materials located in a separate or separable phase, a bilge waste oil holding container 4 and a biomechanical treatment apparatus 5 for the physical separation and biodegradation of contaminants dissolved in bilgewater 6, 19 and oil interface 64. The biomechanical apparatus 5 is sectioned into a phase separator chamber 20, a microbiological chamber 21, and an effluent holding chamber 22.

Bilge waste pumping system 3 preferably comprises of a waste oil collection tank 4, piping system 7 for the suction side and piping system 8 for discharge side. Examples of the intake suction pipe 7 and discharge pipe 8 would include carbon, stainless steel or other metal or plastic composite pipe or tubing. Piping system 7 is connected to particulate screen 10 positioned in oil interface 64. Phase-separated oil from interface 64 is pumped into waste oil holding tank 4 by pumping system 3. Recovery site 9 encompasses bilge oil intake pipe 7, oil particulate screen 10, bilgewater intake pipe 11, and particulate screen 12.

The biomechanical treatment apparatus 5 broadly includes bilgewater recovery pump 13 connected to intake pipe 14 through pipe junction 15 connected to pipe 16 from waste oil holding tank 4 and intake pipe 11 from bilge area 6, metering pump 17 to transfer phase-separated bilgewater from chamber 20 of the biomechanical apparatus, gas injection system 43 connected to air blower 25, biotreatment chamber 21, and treated effluent piping system 23 from effluent holding chamber 22 connected to discharge pump 24. Bilgewater recovery pump 13 is located on the system skid platform 34 preferably in a proximate region to the ship bilge area 2. Bilgewater intake pipe 11 is attached to particulate screen 12 located below bilgewater/non-aqueous phase interface 64. In addition, the piping system 7 can be configured to bypass waste oil holding tank 4 and transfer non-aqueous phase liquid bilge waste at and above interface 64 directly into biomechanical device 5 through pipe junction 15 and pipe 14 using pump 13. Recovery site 9 encompasses intake pipe 11 connected to pipe junction 15 connected to pipe 14, and waste oil holding tank intake pipe 7 connected to bilge waste pumping system 3.

Slow-release nutrients and pH adjustment chemicals are provided via container 27 or a series of chemical addition tubes 28. The gas injection system 43 includes a blower 25; blower 25 pumps gases into the biological chamber 21 of the biomechanical device 5 through piping 43 and gas distribution system 29. Effluent piping system 23 exits biomechanical device 5 from the effluent holding chamber 22 and connects to effluent discharge pump 24. Discharge piping system 30 connects to effluent discharge pump 24 to process effluent though piping system 31 for overboard discharge. Piping system 32 is connected to overflow piping 41 for discharge of the partially processed effluent into bilge area 9 of the ship's bilge 2.

Figure 2:
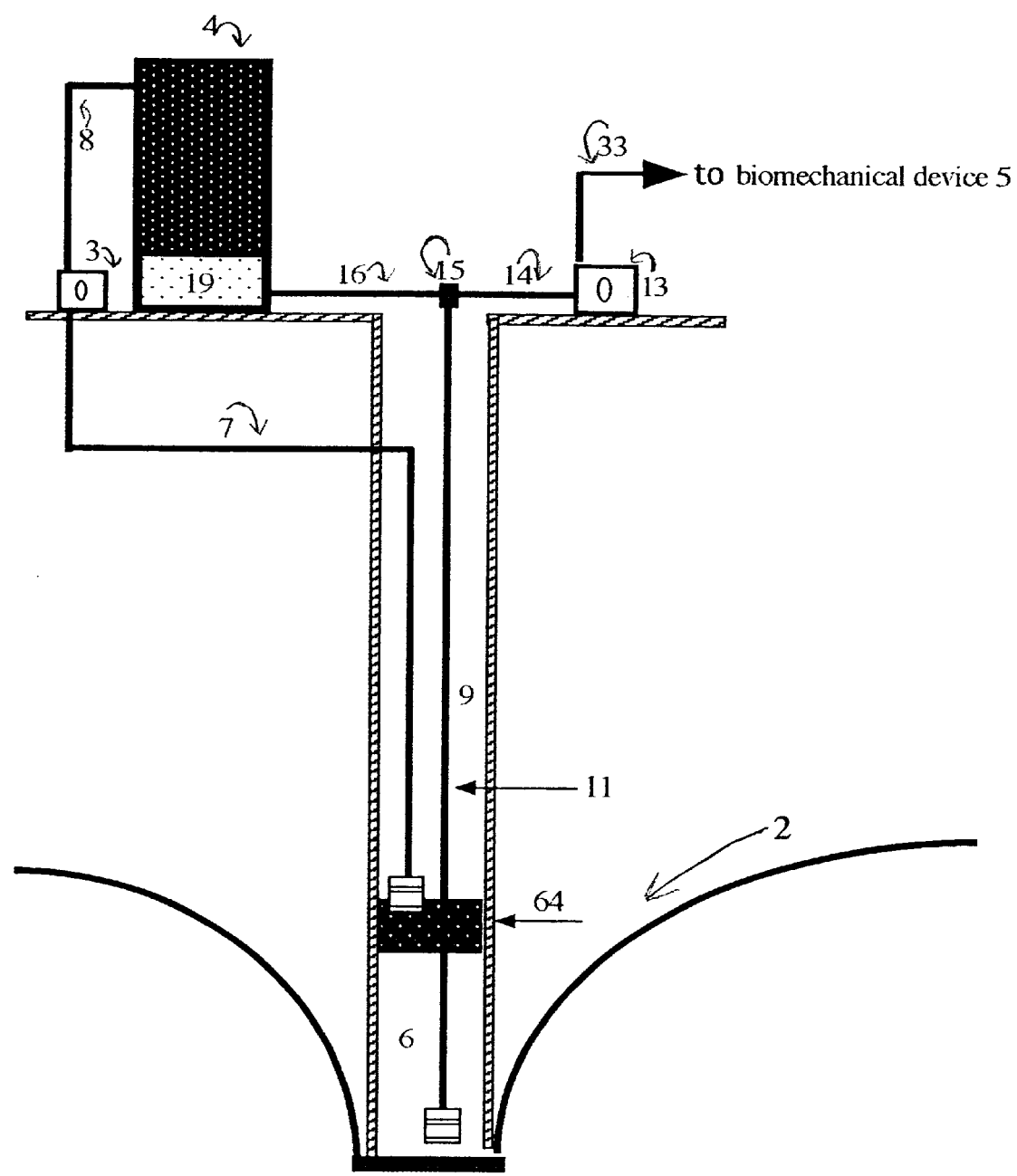
FIG. 2 is a partial schematic drawing of the pumping system related to the biomechanical apparatus of the invention.

A bilge waste pumping system 3 which transfers the aqueous and non-aqueous phase mixture from bilge area 9 into a oily waste collection tank 4 may be employed. Referring to FIG. 2, a bilge waste pumping system may comprise a pump system 3, connected to waste oil collection tank 4, intake pipe 7, and piping system 8. Bilgewater recovery pump 13 can be used to pump phase-separated water 19 from waste oil collection tank 4 via piping system 16 through pipe junction 15 and piping system 14 directly into chamber 20 of the biomechanical device 5. Pump 13 is preferably a total fluids pump to transfer both aqueous and non-aqueous phases into biomechanical device 5. Oil from waste oil holding tank 4 or directly from interface 64 may be processed directly into biomechanical device 5. In addition, phase-separated water from area 6 of bilge site 2 can be pumped directly into chamber 20 of biomechanical device 5 via piping system 11 going through pipe junction 15 and pipe 14 through pump 13 into pipe 33. It is suggested that pump 13 be of the design to minimize the further mixing and emulsification of the petroleum hydrocarbons into the bilgewater. An example of such a pump is the peristaltic pump manufactured by Alfa Laval AB, Rudeboksvägen 3, Lund, Sweden.

Figure 3:
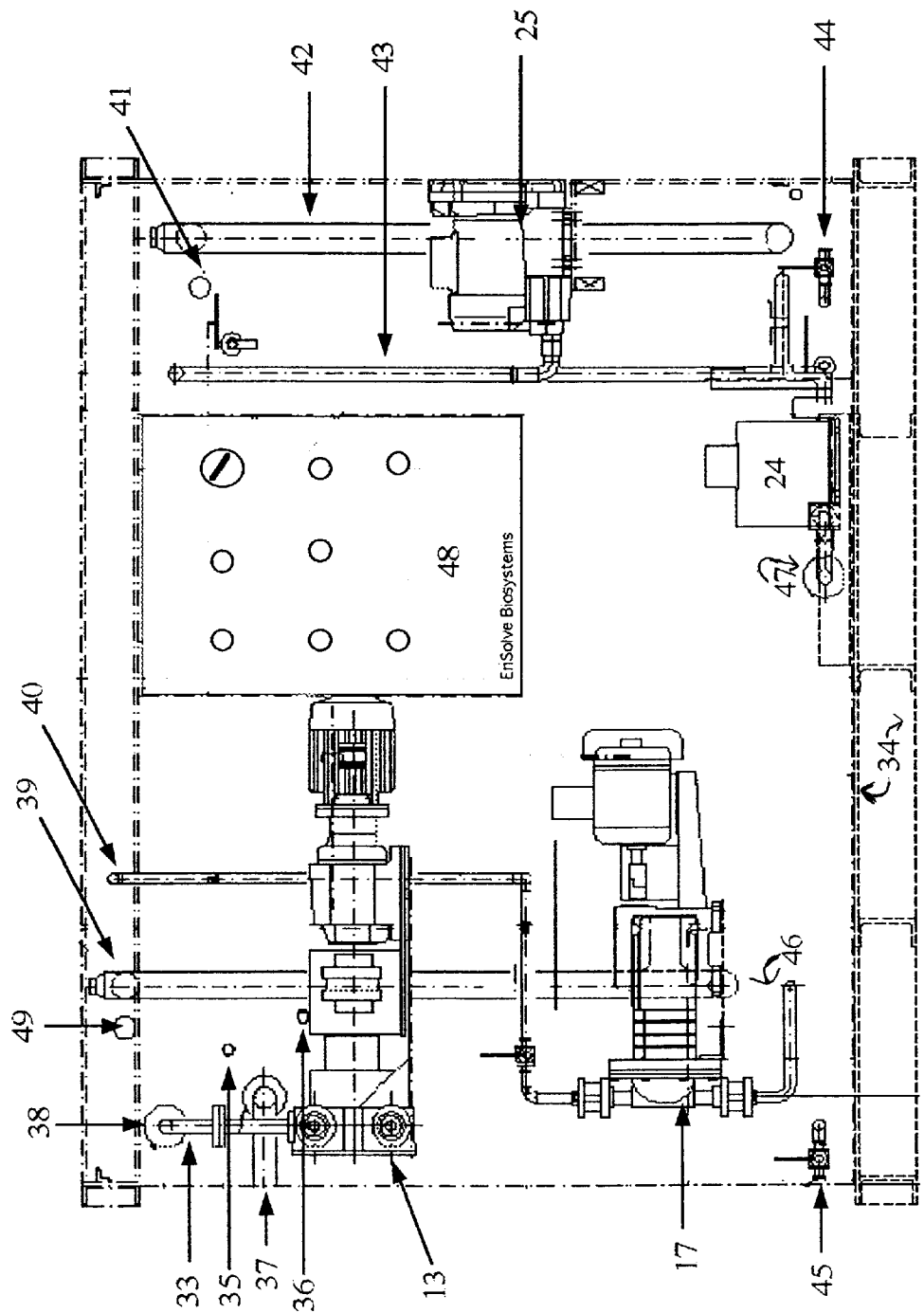
FIG. 3 is a schematic illustration of the biomechanical apparatus showing the proximal location of key components, devices and piping.

Referring to FIG. 3, the schematic shows straight on-view of biomechanical device 5 indicating the proximal locations of pertinent pumps, piping systems, automated control switches and control panel. Bilge waste water from either the bilge compartment 6 of bilge site 2, waste water 19 from the waste oil holding tank 4, or both enters the biomechanical device 5 via bilgewater recovery pump 13 and piping systems 11, 14, 16 (see FIGS. 1 and 2), and 33. Pump discharge pipe 33 from influent pump 13 enters the biomechanical device through coupling 38. Operation of influent pump 13 into chamber 20 of biomechanical device 5 is controlled by liquid level control switch 39, oil probes 35 and 36, all of which are integrated into electrical control panel 48. Phase-separated oil in chamber 20 of biomechanical device 5 is removed via solenoid valve 37 and pipe 62 (see FIG. 1) into waste oil holding tank 4 or predetermined oil holding tank for later disposal. Separation and removal of oil from chamber 20 may be facilitated by heating the chamber 20. Heating may be accomplished, for example, through heat exchange utilizing the steam pipes found on many vessels. Metering pump 17 transfers phase-separated bilgewater from chamber 20 of biomechanical device 5 into chamber 21, which contains biological support media 18, via piping system 40 and 46. Operation of metering pump 17 is controlled by float level switches 39 via control panel 48. Chamber 21 of biomechanical device 5 contains an air distribution system 29 connected, via piping 43, to air blower 25. Processed bilgewater from chamber 21 of biomechanical device 5 flows into effluent holding chamber 22 and is discharged by effluent discharge pump 24 overboard through coupling 47 into piping system 23, 30 and 31. Semi-continuous operation of effluent discharge pump 24 is controlled by liquid level control switch 42 in chamber 22 connected to control panel 48. Conversely, the processed bilgewater may be discharged from chamber 22 of biomechanical device 5 via recirculation pipe 32 connected through overflow port 41 for discharge into bilge area 9 of bilge site 2. Overflow ports 41 and 49 as well as drain ports 45 and 44 are designed in the system for safety in an event of catastrophic equipment failure.

Figure 4:
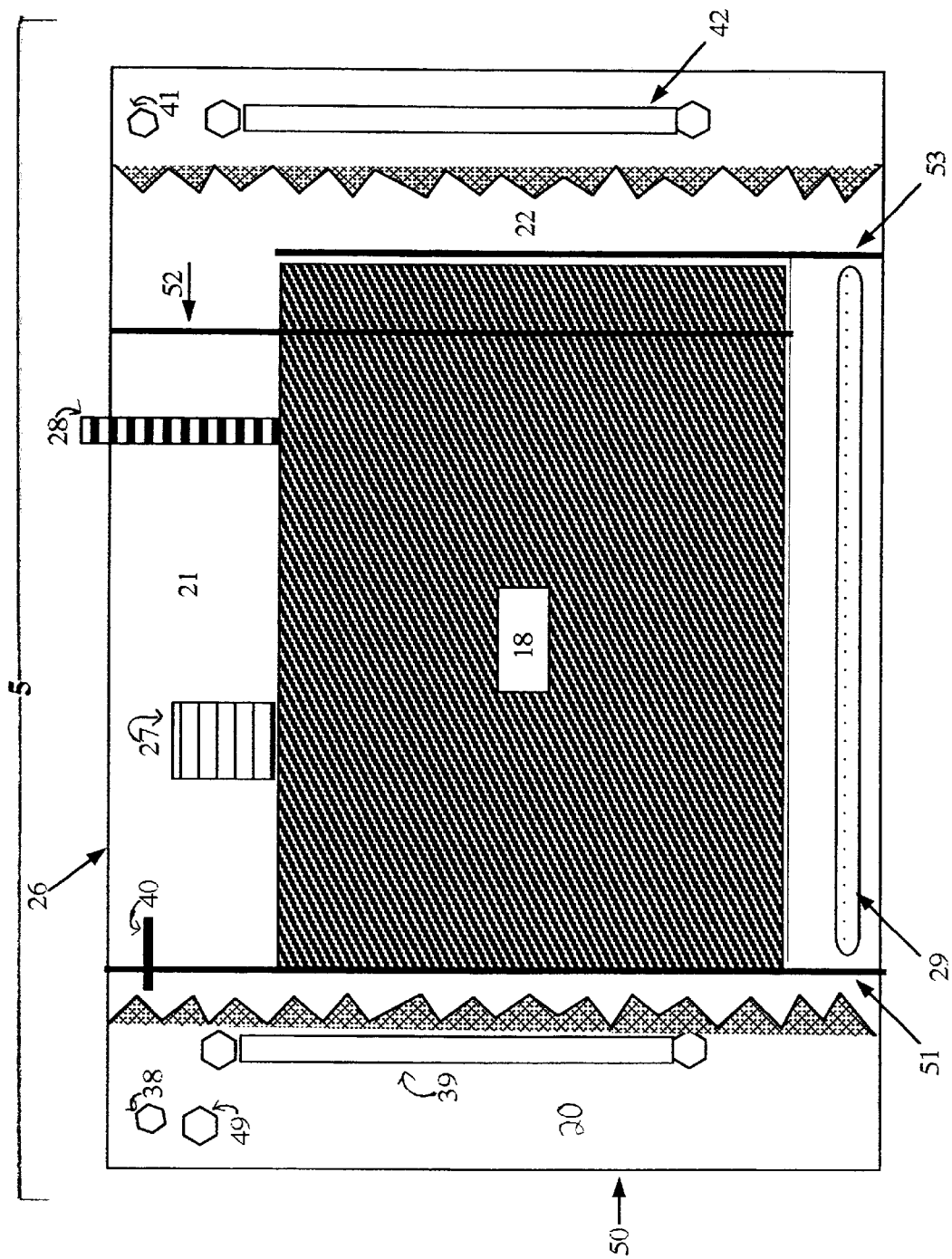
FIG. 4 is a schematic illustration of the biomechanical apparatus having a partial cut-away view of the biological component of the system.

FIG. 4 depicts an embodiment of a biomechanical device 5 suitable for use in the present invention. Referring to FIG. 4, biomechanical device 5 of the present invention is a portable vessel, preferably manufactured from explosion proof equipment and circuitry. The configuration of the vessel may be cylindrical, rectangular, or any other shape that conveniently fits on the ship where the system is to be utilized. The material from which the unit is constructed can be stainless steel, carbon steel or any combination of suitable construction materials. The volume of the vessel will also depend on the space available on the ship. Different size vessels may be constructed to accommodate varying site requirements. Preferably, biomechanical device 5 is sealed with gasket lid 26 (see FIG. 5) to prevent spillage of liquid contents during rough seas and control the escape of any volatilized contaminants. Internally, the biomechanical device 5 may be comprised of three chambers, a pretreatment phase separation chamber 20, a biological treatment chamber 21 containing biological support media 18, and an effluent or clarifier chamber 22. Vessel walls 50, in conjunction with internal walls 51, 52 and 53 segregate the above chambers. The biological support media 18 is divided by wall 52, such that portions of this media are on either side.

Figure 5:
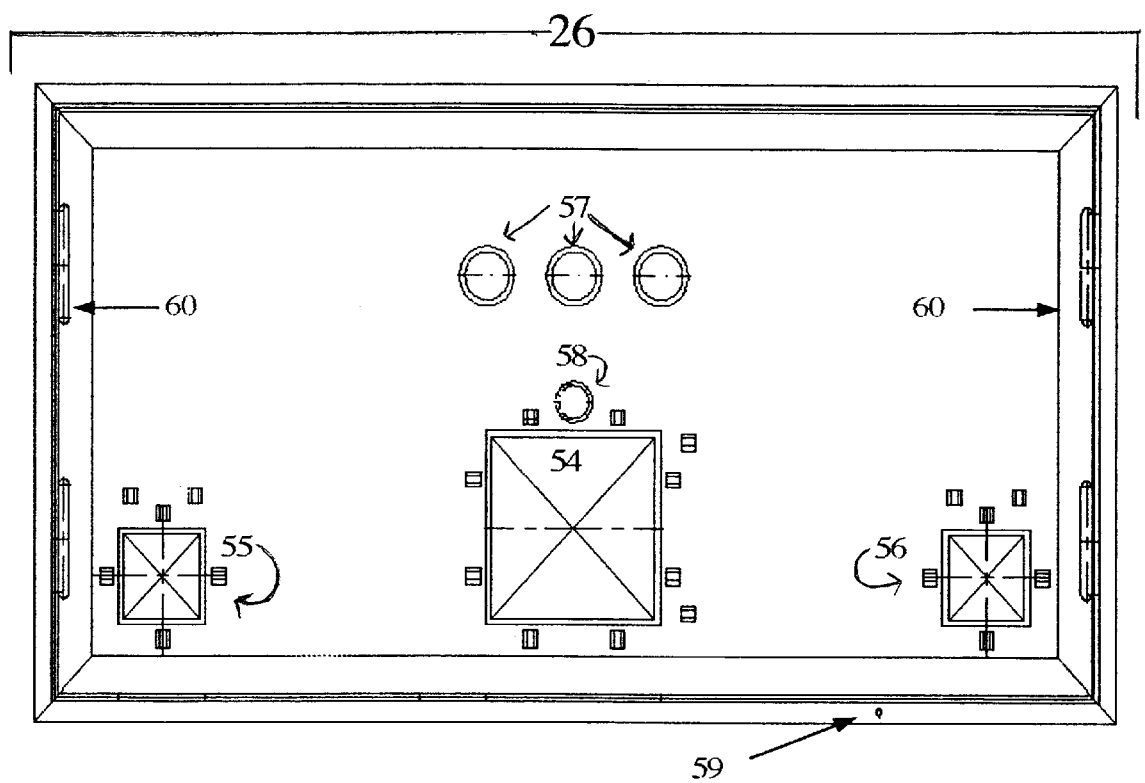
FIG. 5 is a schematic drawing of the lid for biomechanical apparatus showing the proximal location of hatches and fittings.

Referring to FIG. 5, Biomechanical device 5 incorporates a watertight lid 26 to prevent spillage of contents during turbulent seas. Water tight hatch 54 incorporated in lid 26 is centered over chamber 21 of biomechanical device 5 for the addition of slow release pH and nutrient chemicals into container 27 and for monitoring the general condition of the system without removal of lid 26. Hatches 55 and 56 allow access to chambers 20 and 22 respectively. If required, pH and chemical addition tubes 28 can be fitted into lid apertures 57 of lid 26. To maintain a neutral pressure within biomechanical device 5, vent port 58 is constructed into lid 26. Mounting bolts 59 are equally spaced around lid 26 to ensure that biomechanical device 5 is watertight. Lifting handles 60 are strategically placed to assist in removing lid 26 from biomechanical device 5.

Chamber 21 of biomechanical device 5 may contain gas distribution system 29, pH and nutrient control system comprising container 27 and chemical addition tubes 28, microbial support media 18, and a culture of hazardous or non-hazardous material-degrading microorganisms. The pH control and nutrient delivery accomplished utilizing systems 27 and 28 assure optimal growth conditions for microbial activity within chamber 21. Treatment chamber 21 also includes a coupling 38 (see FIG. 3), through which piping 33 enters biomechanical device 5. Preferably coupling 38 is located such that pipe 33 enters above the intake pipe 46 of metering pump 17 to allow for phase separation of the oily bilgewater mixture to occur. Gas distribution system 29 may be fabricated from porous media, perforated pipe, or prefabricated high efficiency diffusers.

The bacterial support media 18 provides a fixed surface to which the bioremediating culture may attach. The media may be manufactured from a semi-rigid material such as polyvinylchloride (PVC), however, other materials may be used. The presently preferred material is a media constructed of overlapping corrugated PVC sheets and forming a large surface area porous block structure. Examples of preferred media types are those manufactured by Brentwood Industries, Inc., Corporate Headquarters, P.O. Box 605, Reading, Pa. 19603 (ACCUPAC®) and EnSolve Biosystems, Inc., 3209 Gresham Lake Rd, Suite 147, Raleigh, N.C. 27615 (ENCHARGE™).

The regenerative culture of biodegrading microorganisms may comprise bacteria, actinomycetes, fungi, algae, and mixtures thereof. The microorganisms may remain fixed to support media 18 throughout their life span. During growth phase, the microorganisms may detach from support media 18 and slough off into the contaminated bilgewater. The microorganisms may be of a species indigenous to the contaminated bilge site 6, oil waste holding tank 4, non-indigenous sources, genetically engineered, or mixtures thereof. Nonpathogenic bacteria are preferred. Typical bacteria useful in the present invention include: Pseudomonas, Flavobacterium, Bacillus, Norcardia, Acinetobacter, Corynebacterium, Achromobacter, Mycobacterium, and Micrococcus. Also useful are enriched bacterial cultures selected on the basis of their ability to use a given biodegradable material as their sole carbon source. As will be appreciated by those skilled in the art, cultures of genetically engineered or otherwise enriched bacteria designed to use the given contaminating biodegradable material as their sole carbon source, results in faster remediation process at lower costs than other currently available technologies.

In operation, the bilge waste pump 3, waste oil holding tank 4 and influent pump 13, interact with biomechanical device 5 to efficiently and quickly biodegrade phase-separated contaminated bilgewater 6 and 19. In particular, by removing the non-aqueous organic phase, i.e., phase-separated product, bilge waste pump system 3, influent pump 13 and chamber 20 of the biomechanical device 5 protects the microbial culture in chamber 21 from toxic overloading of the biodegradable material. Chamber 20 contains a block of a high surface material 63 to facilitate the separation of petroleum hydrocarbons from water. In addition, removal of the organic phase prevents it from acting as a reservoir of contaminants capable of maintaining the concentration of contaminants in the bilgewater at pre-bioremediation levels for extended periods. These features permit users to maintain substantially continuous microorganism regeneration and biodegradation of contaminants in the bilgewater, thereby producing an efficient, safe, and dependable bioremediation system.

Upon arrival at the ships' bilge site 2 the operator arranges the apparatus as described above at or near recovery site 9. The operator fills chamber 21 of the biomechanical device 5 with recovered bilgewater 19 from waste oil holding tank 4 or directly from area 6 of bilge site 2, then engages blower 25. Liquid or dried microorganisms are then introduced into chamber 21 of biomechanical device 5. As a result of interactions between the microbial population and the support media 18, a significant portion of the microorganisms attach to support media 18. Nutrients and pH adjustment chemicals are added into container 27 and if necessary, via tubes 28 to assist in providing the required growth conditions of the microbial population in chamber 21 of biomechanical device 5.

Preferably, the bacterial culture is acclimated to, and selectively degrades, the biodegradable material typically contained in bilgewater. The culture is permitted to grow for approximately 24 to 36 hours before energizing pump 13 to commence flow through of contaminated bilgewater 19 from the bilge waste oil holding tank 4 in conjunction with or separate from bilgewater located in area 6 of bilge site 2.

Figure 6:
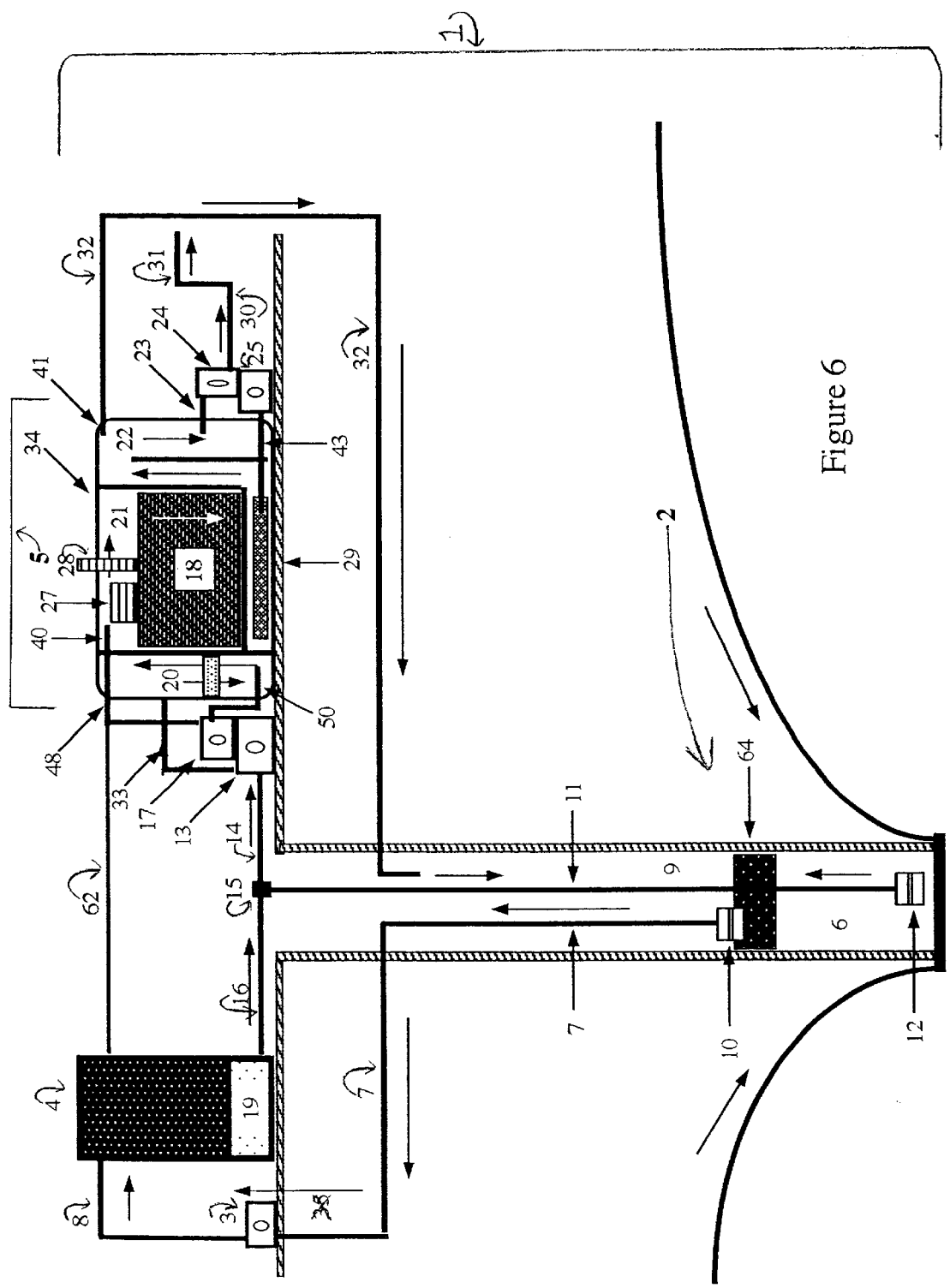
FIG. 6 is a schematic for the flow of contaminated bilgewater through the bilge waste pump system of FIG. 2 and the biomechanical apparatus.

Activation of the biomechanical apparatus 1 starts the bilgewater bioremediation flow depicted in FIG. 6. Referring to FIG. 6, a biomechanical system 1, having integrated bilge waste pumping systems 3 and 13 and biomechanical remediation device 5, is depicted. The bilge waste pumping systems 3 and 13 and the biomechanical device 5 operate concurrently. To commence operation, contaminated bilgewater is pumped into the biomechanical device 5 by pump 13 via lines 11, 14 and 16. Alternately, pump 13 can pump phase-separated bilgewater 19 from waste oil holding tank 4 directly to the biomechanical device 5 via piping system 16 through junction 15 to pipe 14. Contaminated bilgewater flows through piping system 14 and pump 13 to pipe 33 directly into chamber 20 of biomechanical device 5. Chamber 20 of biomechanical device 5 performs as an oil water separator with separated oil removed via solenoid 37 (see FIG. 3) and piping system 62 for return to bilge area 2 or gravity fed to waste oil holding tank 4 or predetermined waste oil holding tank. The phase-separated water in chamber 20 of biomechanical device 5 is transferred via pump 17 and piping system 40 and 46 into chamber 21 of biomechanical device 5. Slow-release nutrients and pH adjustment chemicals can be provided via container 27 or tubes 28. Container 27 and tubes 28 do not require the use of a pump or mixer system. Container 27 and tubes 28 typically include a means, such as holes, which allow the passage of bilgewater into and out of the container or by the openings of the tubes. Container 27 and tube 28 includes nutrients, and pH adjusting materials, which are released into the bilgewater due to the action of the bilgewater passing into and out of the container. Nutrients may contain appropriate concentrations of nitrogen, phosphorus, and, optionally, other inorganic salts necessary for maintenance of enhanced bioactivity. Preferred nitrogen containing compounds are $NH_4Cl$, $NH_4NO_3$, $NaNO_3$, or $(NH_4)_2SO_4$, although urea or urea-formaldehyde may also be used. Phosphorus is readily provided as $KH_2PO_4$, $NaHPO_4$, $Na_2HPO_4$, and the like.

Certain low concentrations of metals commonly found in bilgewater are beneficial to microbial growth and bioactivity.

After enrichment with nutrients, the bilgewater in chamber 21 of biomechanical device 5 flows downward and across the biological support media 18 containing hydrocarbon-degrading microorganisms fixed thereto. Concurrent with the introduction of contaminated bilgewater, gas distribution system 29 connected to blower 25 forces air into chamber 21 in the form of fine (small) bubbles. The diffused air dissolves into the bilgewater. In response to the addition of nutrients and contaminants, the bacterial culture grows and biodegrades the contaminants. The majority of the microorganisms remain fixed to support media 18 as the bilgewater flows over said media. Some of the microorganisms, however detach from, or slough off, the media 18 and disperse into bilgewater in chamber 21 and chamber 22 of biomechanical device 5. The fixed microorganisms continually grow replacing those microorganisms sloughed off, continual growth by the fixed microbial cell population results in a substantially constant microbial biomass within the chamber 21 of biomechanical device 5. Upon reaching the bottom of chamber 21, the now treated bilgewater flows upward and into effluent holding chamber 22 of biomechanical device 5. Once the chamber 22 reaches a pre-determined level, as specified by float level switches 42 (see FIG. 3), effluent discharge pump 24 is energized and discharges effluent from chamber 22 through coupling 47 (see FIG. 3) via piping 23, 30 and 31 overboard. Overboard discharge is also controlled by the petroleum hydrocarbon concentration in the effluent contained in chamber 22 of biomechanical device 5. Piping system 32 is connected to overflow port 41 (see FIG. 3) for the passive recirculation of treated effluent water from chamber 22 into bilge area 9 of bilge site 2.

An oil content monitor to determine petroleum hydrocarbon concentrations can continuously monitor treated effluent water in chamber 22 of biomechanical device 5. Electrical outputs from such an oil content monitor can be utilized to energize pump 24 and direct the flow of the treated effluent water in chamber 22 overboard through piping system 23, 30, and 31. Pump 24 is only energized if the hydrocarbon concentration is at or below legally accepted standards. An example of such an oil content monitor designed for bilge applications is on-line monitor model TD-4100, manufactured by Turner Design, Inc., 845 W. Maude Ave., Sunnyvale, Calif. Oil content monitors from different manufacturers compatible with bilge environments would also be applicable for this purpose. If the hydrocarbon concentration is above such standards, the oil content monitor can prevent the operation of pump 24 and prevent the overboard discharge of system effluent from chamber 22 of biomechanical device 5. As a result of pump 24 not being energized, the effluent level in chamber 22 will fill until reaching overflow port 41 which allows the passive flow of treated effluent through piping system 32 into bilge area 9 of bilge site 2.

In operation, pumping system 13 selectively transfers phase-separated bilgewater from bilge area 6 of bilge site 2 or phase-separated bilgewater 19 from waste oil holding tank 4. Liquid level control switch 42 (see FIG. 3) controls the on and off operation of pump 13 via control panel 48 (see FIG. 3) depending upon predetermined bilgewater volumes in chamber 20 of biomechanical device 5. Level control switch 39 (see FIG. 3) controls the on and off operation of metering pump 17 for the transfer of bilgewater in chamber 20 to chamber 21 via pipe 40. Alternatively, pumping system 13 can be used to pump phase-separated bilgewater 19 from waste oil holding tank 4 directly into biomechanical device 5 via piping system 16, 14 and 33. Phase-separated product 64 is pumped by chemical feed pump 3 into waste oil collection tank 4, via intake pipe 7 and 8. As waste oil holding tank 4 fills, phase-separated oily bilgewater 19 is pumped directly into chamber 20 of the biomechanical device 5 via pump 13. As separated bilgewater 19 is pumped out of waste oil holding tank 4 into chamber 20 of biomechanical device 5, phase-separated oil 64 in waste oil holding tank 4 may be pumped directly into chamber 20. Bilgewater pump 13 draws bilgewater up intake pipe 11 from bilge area 6, into piping system 14 and eventually into chamber 20 of biomechanical device 5. Biomechanical device 5 functions to further phase-separate oily bilgewater and bioremediate the bilgewater contaminants as describe above.

Bioremediation following the above procedures may be performed at ambient temperatures. Those skilled in the art will appreciate, however, that bioremediation is more efficient at the optimum temperatures for microorganisms growth and biodegradation. The preferred temperature may be determined empirically. Accordingly, to insure the maintenance of preferred temperatures in colder climates, the apparatus may be equipped with heating units (not shown) and insulation.

If the treated effluent water from chamber 22 of biomechanical device 5 is released into the bilge area site 2, the recirculated microorganisms provide a seed culture for performing in situ bioremediation. Specifically, the microorganisms biodegrade contaminants dispersed in the resident bilgewater 6. Preferably, the recirculated microorganisms flow toward intake pipe 11 or 7, thus establishing a closed-loop (or complete) bioremediation circulatory system.

The apparatus of the present invention has several advantages resulting from the integration of the bilge waste pumping systems 13 and 17 and chamber 20 of biomechanical device 5. First, pump 13 allows for the transfer of phase-separated bilgewater directly from the bilge area 6 or from phase-separated water 19 from the bottom of waste oil holding tank 4 directly into chamber 20 of biomechanical device 5. Chamber 20 performs as an oil water separator with free product petroleum hydrocarbons removed from chamber 20 via solenoid 37 (see FIG. 3) and piping system 62. Second, pumping system 13 in conjunction with pump 17 and level switches 39 (see FIG. 3) precisely meters and therefore controls the flow of bilgewater into chamber 21 of biomechanical device 5. The integration of bilge waste pumping system 3 and 17 into the apparatus I facilitates the critical removal of potentially toxic concentrations of phase-separated product prior to its entrance into chamber 21 of biomechanical device 5, thus protecting the microbial culture from toxic overloading of the biodegradable material. In conjunction with the described pumping system, chamber 20 of biomechanical device 5 further facilitates the separation of aqueous and non-aqueous bilge waste components. The removal of the phase-separated product also prevents this material from increasing the contaminant's concentration in the bilgewater. These features permit users to maintain substantially continuous microorganisms regeneration and biodegradation both above-bilge and in situ. Thus, the combination of these systems produces an efficient, safe, and fast-acting bioremediation system.

The present invention also provides an efficient system combining an oil water separator and biological process for the treatment of bilgewater contaminated with hazardous wastes. In one aspect, the present invention provides a process for the microbiological remediation of a bilge contaminated with a biodegradable material comprising the steps of:

removing liquid bilge waste material contaminated with biodegradable materials from aqueous and non-aqueous phases, removing bilgewater contaminated with a biodegradable material from waste oil holding tank resulting in a higher concentration of petroleum hydrocarbon in the tank for subsequent recovery;

supplementing said removed bilgewater with gases and a blend of nutrients in a vessel to enhance the growth of biodegradable material biodegrading microorganisms;

treating said bilgewater by concurrently culturing said microorganisms in said supplemented bilgewater and biodegrading the biodegradable material therein, said treatment producing a culture of microorganisms comprising a film of microorganisms which remain fixed to a support media in the vessel, and microorganisms, arising from said fixed film, which slough off said support media and disperse into the bilgewater;

discharging said bilgewater overboard after system process via controlled monitor and discharge piping system, or;

recirculating said treated bilgewater containing nutrients, dissolved gases, and said sloughed off microorganisms to a location proximate to the contaminated bilge area; and permitting the sloughed off microorganisms to perform in situ biodegradation within the site after recirculation proximate to said biodegradable material contaminated bilge area;

whereby said process continuously remediates a biodegradable material dissolved in said bilgewater and provides a substantially continuous seed culture, for in situ remediation of said bilge area, which biodegrades biodegradable materials dissolved in the bilgewater located at said contaminated bilge. Preferably the treatment step further comprises producing a substantially constant microbial biomass fixed to said support media. It is also preferred that the treatment step permits the microorganisms to slough off said support media at a substantially constant rate. Further, it is preferred that the treatment step further comprises a means for discharging said treated bilgewater to the surrounding ship's waters for the purpose of bioremediation of said waters.

The process of the present invention advantageously combines a petroleum hydrocarbon phase separator and biological treatment process in one unit;

In addition, the process of the present invention advantageously allows for the passive delivery of nutrients to said microorganisms without the necessity of pumps and mixers. In particular, the present invention provides a process for supplying nutrients to an aqueous system including microorganisms, the process comprising:

supplying nutrients to a container adapted to allow the passage of the aqueous system into and out of the inside of the container, wherein the passage of the aqueous system into and out of the container causes the release of nutrients from the container into the aqueous system.

Further, the process of the present invention allows for the passive delivery of pH adjustment chemicals to said microorganisms without the necessity of pumps and mixers. In particular, the present invention provides a process for supplying pH adjusting chemicals to an aqueous system, the process comprising:

supplying pH adjusting chemicals to a container adapted to allow the passage of the aqueous system into and out of the inside of the container, wherein the passage of the aqueous system into and out of the container causes the release of pH adjusting chemicals from the container into the aqueous system. In the biomechanical device embodiment discussed above, the passage of the aqueous system (bilgewater) into and out of the container causes the release of pH adjusting chemicals from the container into the biomechanical device.

In another aspect, the invention relates to a process for the microbiological remediation of a bilge area contaminated with a biodegradable material comprising:

removing liquid bilge wastes contaminated with biodegradable materials from both aqueous and non-aqueous phases comprising phase-separated hydrocarbons;

supplementing the removed liquid bilge wastes with gases and a blend of nutrients in a vessel to enhance the growth of biodegradable material biodegrading microorganisms;

treating the liquid bilge wastes by concurrently culturing the microorganisms in the supplemented liquid bilge wastes and biodegrading the biodegradable material therein, the treatment producing a culture of microorganisms comprising a film of microorganisms which remain fixed to a support media in the vessel, and microorganisms, arising from the fixed film, which slough off the support media and disperse into the liquid bilge wastes;

recirculating the treated liquid bilge wastes containing nutrients, dissolved gases, and the sloughed off microorganisms to a location proximate to the contaminated bilge area; and permitting the sloughed off microorganisms to perform in situ biodegradation within the site after recirculation of treated liquid bilge wastes proximate to the biodegradable material contaminated bilge area;

whereby the process continuously remediates a biodegradable material dissolved in the liquid bilge wastes and provides a substantially continuous seed culture, for in situ remediation of said contaminated bilge area, which biodegrades biodegradable materials dissolved in the bilgewater located at the contaminated bilge area. More preferably, the treating the liquid bilge wastes further comprises producing a substantially constant microbial biomass fixed to the support media. Also more preferably, the biodegradable material biodegraded by the microorganisms is selected from the group consisting of alcohols, aromatics, carbohydrates, ketones, petroleum hydrocarbons, hydraulic fluids, phenols, phthalates, solvents, chlorinated compounds, detergents, synthetic oils, lubricants and mixtures thereof. Also more preferably, the liquid bilge wastes contaminated with a biodegradable material are removed from below an aqueous phase/non-aqueous phase interface.

In a preferred embodiment, the treating of the liquid bilge wastes further comprises permitting the microorganisms to slough off the support media at a substantially constant rate.

In another preferred embodiment, the treating the liquid bilge wastes further comprises discharging the treated bilgewater to the surrounding ship's waters for the purpose of bioremediation of the waters.

In another aspect, the invention relates to a process for supplying nutrients to a regenerating culture of microorganisms, the process comprising:

supplying nutrients to an aqueous system to produce a nutrified aqueous system; and delivering the nutrified aqueous system to a vessel containing the regenerating culture of microorganisms, wherein the regenerating culture of microorganisms comprises i) a film of microorganisms remaining fixed to a support media in the vessel and ii) microorganisms, arising from said fixed film, which slough off the support media and disperse into the nutrified aqueous system. More preferably, the process comprises passively supplying nutrients to the aqueous system.

In another aspect, the invention relates to a process for supplying pH adjusting chemicals to a regenerating culture of microorganisms, the process comprising:

supplying pH adjusting chemicals to an aqueous system to produce a pH adjusted aqueous system; and delivering the pH adjusted aqueous system to a vessel containing the regenerating culture of microorganisms, wherein the regenerating culture of microorganisms comprises i) a film of microorganisms remaining fixed to a support media in the vessel and ii) microorganisms, arising from the film, which slough off the support media and disperse into the pH adjusted aqueous system. More preferably, the process comprises passively supplying pH adjusting chemicals to the aqueous system.

The features and advantages of the apparatus and processes of the present invention are further illustrated by the following Example.

EXAMPLE

A biomechanical oil water separator device according to the present invention was constructed and evaluated to determine the effectiveness of the system to reduce the level of petroleum hydrocarbons in bilgewater. The configuration of the biomechanical device was substantially the same as depicted in FIGS. 3, 4, and 5. The testing procedure was in accordance with 46-Code of Federal Regulations 162.050 as specified by the United States Coast Guard. The United States Coast Guard required that ridged performance criteria for the biomechanical oil water separator be achieved in order to obtain their Certificate of Approval.

A 600-gallon biomechanical oil water separator was utilized during the United States Coast Guard examination process. Varying concentrations of diesel fuel oil and bunker C oil from 0 percent to 100 percent were processed through the unit at a constant flow rate of 2 gallons/min. The process flow for the system during this evaluation process closely resembled the flow pattern for the biomechanical device depicted in FIG. 6.

Effluent samples (post-treatment discharge from the biomechanical device) were collected throughout the evaluation period. Once collected, these samples were extracted and analyzed using U.S. Environmental Protection Agency Method 418.1 to determine the total petroleum hydrocarbon concentrations. During the period of operation, effluent samples from the biomechanical device described above contained petroleum hydrocarbon concentrations from 5.9 ppm to 4.0 ppm, well below the current United States Coast Guard criteria of 15 ppm for legal overboard discharge. Performance tests with bilgewater samples from cargo vessels and cruise ships have produced very similar results.

These results, in conjunction with the Certificate of Approval from the United States Coast Guard, indicate that the biomechanical device of the present invention, including the process and apparatus of the present invention, is effective in the phase separation and bioremediation of bilgewater contaminated with petroleum hydrocarbons.

It will thus be seen that the objects set forth, among those made apparent from the preceding description, are efficiently obtained and, since certain changes may be made in carrying out the above embodiments and in the composition and method set forth, without departing from the spirit and scope of the invention, it is intended that all matter contained in the above description shall be interpreted as illustrative and not in a limiting sense.

It is also to be understood that the following claims are intended to cover all of the generic and specific features of the invention herein described and all statements of the scope of the invention which, as a matter of language, might be said to fall there between.

What is claimed is:

1. An apparatus for the microbiological remediation of a site contaminated with a biodegradable material comprising:

means for removing liquid bilge wastes contaminated with biodegradable materials from both aqueous and non-aqueous phases;

a vessel for treating said liquid bilge wastes to cause the biodegradation of said biodegradable materials;

means for separating phase-separated hydrocarbon material from aqueous phase material in the bilge compartment;

means for collecting said phase-separated hydrocarbon material;

means for minimizing emulsification of hydrocarbons in water;

means for optimizing separation of hydrocarbons from water, said means comprising a coalescing filter;

a microbiological chamber comprising hydrocarbon-degrading microorganisms;

means comprising a continuously regenerating culture of microorganisms disposed in said microbiological chamber, said culture comprising a film of microorganisms which are fixed to a support media in said microbiological chamber and microorganisms, arising from said film of fixed microorganisms, which slough off said support media and disperse into said aqueous phase material;

means for transferring said aqueous phase material to said microbiological chamber;

means for ensuring that phase-separated hydrocarbons do not get transferred to said microbiological chamber;

means for maintaining a flow of aqueous phase material over the culture of microorganisms;

means for introducing gases into said vessel to support the growth of the culture of microorganisms;

means for introducing nutrients into said vessel to support the growth of microorganisms; and means for discharging the treated aqueous phase material overboard.

2. The apparatus of claims 1, further comprising a means for removing bilgewater contaminated with biodegradable material from above, below, and within an aqueous phase/non-aqueous phase interface.

3. The apparatus of claim 1 wherein the microorganisms fixed to the support media comprise a substantially constant microbial biomass.

4. The apparatus of claim 1 wherein said means for introducing gases into said vessel comprises a fine bubble diffuser.

5. The apparatus of claim 1 further comprising means for recirculating treated aqueous phase material and returning said treated aqueous phase material to the contaminated bilge site; and means for delivering bilgewater containing nutrients, dissolved gases and microorganisms which slough off said support media to said means for recirculating and returning said aqueous phase material into said contaminated bilgewater within the contaminated bilge area;

whereby said culture of microorganisms provides both biodegradation of biodegradable material in said treated aqueous phase material and a substantially continuous feed of seed culture for in situ remediation of the bilge area which biodegrades biodegradable materials dissolved in the bilgewater located at said contaminated bilge area.

6. A process for the microbiological remediation of a bilge area contaminated with a biodegradable material comprising:

removing liquid bilge wastes contaminated with biodegradable materials from both aqueous and non-aqueous phases comprising phase-separated hydrocarbons;

supplementing said removed liquid bilge wastes with gases and a blend of nutrients in a vessel to enhance the growth of biodegradable material biodegrading microorganisms;

treating said liquid bilge wastes by concurrently culturing said microorganisms in said supplemented liquid bilge wastes and biodegrading the biodegradable material therein, said treatment producing a culture of microorganisms comprising a film of microorganisms which remain fixed to a support media in the vessel, and microorganisms, arising from said fixed film, which slough off said support media and disperse into the liquid bilge wastes;

recirculating said treated liquid bilge wastes containing nutrients, dissolved gases, and said sloughed off microorganisms to a location proximate to the contaminated bilge area; and permitting the sloughed off microorganisms to perform in situ biodegradation within a site after recirculation of treated liquid bilge wastes proximate to said biodegradable material contaminated bilge area;

whereby said process continuously remediates a biodegradable material dissolved in said liquid bilge wastes and provides a substantially continuous seed culture, for in situ remediation of said contaminated bilge area, which biodegrades biodegradable materials dissolved in the bilgewater located at said contaminated bilge area.

7. The process of claim 6 wherein said treating said liquid bilge wastes further comprises producing a substantially constant microbial biomass fixed to said support media.

8. The process of claim 6 wherein said treating said liquid bilge wastes further comprises permitting the microorganisms to slough off said support media at a substantially constant rate.

9. The process of claim 6 wherein the biodegradable material biodegraded by said microorganisms is selected from the group consisting of alcohols, aromatics, carbohydrates, ketones, petroleum hydrocarbons, hydraulic fluids, phenols, phthalates, solvents, chlorinated compounds, detergents, synthetic oils, lubricants and mixtures thereof.

10. The process of claim 6, wherein the liquid bilge wastes contaminated with a biodegradable material are removed from below an aqueous phase/non-aqueous phase interface.

11. The process of claim 6 wherein said treating said liquid bilge wastes further comprises discharging said treated bilgewater to waters surrounding a ship for the purpose of bioremediation of said waters.

12. An apparatus for the microbiological remediation of a site contaminated with a biodegradable material comprising:

a pump and piping system for removing liquid bilge wastes contaminated with biodegradable materials from both aqueous and non-aqueous phases comprising phase-separated hydrocarbon material;

a vessel for treating said liquid bilge wastes to cause the biodegradation of said biodegradable materials;

a pumping and piping system having intake inlets disposed such that phase-separated hydrocarbon material and aqueous phase material may be separately removed from a bilge compartment;

a vessel for collecting said phase-separated hydrocarbon material;

a microbiological chamber comprising a culture of hydrocarbon-degrading microorganisms;

a pumping and piping system for transferring said aqueous phase material to said microbiological chamber;

a pumping and piping system for maintaining a flow of aqueous phase material over the culture of microorganisms;

a pumping and piping system for discharging the treated aqueous phase material overboard.

13. The apparatus of claim 12 wherein said pumping and piping system for transferring said aqueous phase material to said microbiological chamber is adapted to minimize emulsification of hydrocarbons in water.

14. The apparatus of claim 13 wherein said pumping and piping system comprises a peristaltic pump.

15. The apparatus of claim 13 wherein said subcompartment is in communication with a pumping and piping system having intake inlet comprising a coalescing filter.

16. The apparatus of claim 12 wherein said vessel for treating said liquid bilge wastes to cause the biodegradation of said biodegradable materials further comprises a subcompartment for optimizing separation of hydrocarbons from water.

17. The apparatus of claim 12 wherein said microbiological chamber comprises a continuously regenerating culture of microorganisms, said culture comprising a film of microorganisms which are fixed to a support media in said microbiological chamber.

18. The apparatus of claim 17 wherein microorganisms arising from said film of fixed microorganisms slough off said support media and disperse into said aqueous phase material.

19. The apparatus of claim 12 wherein said microbiological chamber further comprises a pumping system for introducing gases into said microbiological chamber to support the growth of said culture of microorganisms.

20. The apparatus of claim 19, wherein said pumping system comprises an outlet connected to a fine bubble diffuser.

21. The apparatus of claim 12 wherein said microbiological chamber further comprises an inlet for introducing nutrients to support the growth of microorganisms.

22. The apparatus of claim 21 wherein said inlet comprises a nutrient introduction chamber in communication with the exterior of the apparatus and with the interior of said microbiological chamber, such that movement of liquid within said chamber causes release of said nutrients into said microbiological chamber from said nutrient introduction chamber.

23. The apparatus of claim 21 wherein said inlet comprises one or more nutrient introduction tubes in communication the exterior of the apparatus and with the interior of said microbiological chamber, such that movement of liquid within said chamber causes release of said nutrients into said microbiological chamber from the outlets of said one or more nutrient introduction tubes.

24. The apparatus of claim 12 further comprising one or more oil content monitors.

25. The apparatus of claim 24, wherein at least one oil content monitor is positioned to monitor treated aqueous phase material, said oil content monitor being operatively connected to said piping and pumping system for discharging the treated aqueous phase material overboard, such that said monitor controls the piping and pumping system to prevent discharge when oil levels in said material exceed a predetermined amount.

* * * * *